United States Patent
Xi

(10) Patent No.: US 9,057,846 B2
(45) Date of Patent: Jun. 16, 2015

(54) SYSTEMS AND METHODS FOR SUBSEA OPTICAL CAN BUSES

(75) Inventor: Huijiang Xi, Maitland, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 378 days.

(21) Appl. No.: 13/551,346

(22) Filed: Jul. 17, 2012

(65) Prior Publication Data

US 2014/0023365 A1    Jan. 23, 2014

(51) Int. Cl.
*H04J 14/00* (2006.01)
*G02B 6/38* (2006.01)
*H04L 12/40* (2006.01)
*H04L 12/46* (2006.01)
*H04B 10/278* (2013.01)

(52) U.S. Cl.
CPC ........ *G02B 6/3816* (2013.01); *H04L 12/40032* (2013.01); *H04L 12/4625* (2013.01); *H04L 2012/40215* (2013.01); *H04B 10/278* (2013.01)

(58) Field of Classification Search
CPC ............................................ H04L 2012/40125
See application file for complete search history.

(56) References Cited

U.S. PATENT DOCUMENTS

| | | | | |
|---|---|---|---|---|
| 5,363,367 A * | 11/1994 | Kobayashi et al. | ........... | 370/474 |
| 5,809,077 A | 9/1998 | Dorner et al. | | |
| 5,999,389 A * | 12/1999 | Luebke et al. | ................ | 361/68 |
| 6,587,986 B1 * | 7/2003 | Kanazawa et al. | ........... | 714/774 |
| 6,839,789 B2 | 1/2005 | Krämer et al. | | |
| 6,956,996 B2 * | 10/2005 | Gordon et al. | .................. | 385/48 |
| 6,996,649 B2 | 2/2006 | Necker et al. | | |
| 7,017,072 B1 * | 3/2006 | Barrenscheen et al. | ....... | 714/4.2 |
| 2004/0027152 A1 * | 2/2004 | Binder | ............ | 326/30 |
| 2005/0095006 A1 | 5/2005 | Evangelides et al. | | |
| 2005/0135331 A1 * | 6/2005 | Reindl et al. | .................. | 370/351 |
| 2006/0132170 A1 * | 6/2006 | Fahrbach et al. | ............... | 326/30 |
| 2006/0160511 A1 * | 7/2006 | Trichy et al. | .................. | 455/255 |
| 2007/0173957 A1 * | 7/2007 | Johansen et al. | .................. | 700/9 |
| 2008/0050121 A1 | 2/2008 | Evangelides et al. | | |
| 2009/0183033 A1 * | 7/2009 | Ando | .............................. | 714/43 |
| 2009/0198856 A1 * | 8/2009 | Habben | ........................ | 710/305 |

(Continued)

FOREIGN PATENT DOCUMENTS

| | | | |
|---|---|---|---|
| DE | 10 2010 061 734 A1 | 5/2012 | |
| GB | 2259834 A | 3/1993 | |
| WO | 2011/037187 A1 | 3/2011 | |

OTHER PUBLICATIONS

International Search Report and Written Opinion for corresponding PCT/US2013/049297, mailed on Oct. 30, 2013, in 11 pages.

(Continued)

*Primary Examiner* — Ken Vanderpuye
*Assistant Examiner* — Amritbir Sandhu
(74) *Attorney, Agent, or Firm* — Procopio Cory Hargreaves & Savitch LLP

(57) ABSTRACT

Messages on controller area network (CAN) buses are communicated over subsea optical links. An adaptor couples a CAN bus to an optical link. The adaptor detects a direction of transmission, that is, whether a signal began on the CAN bus coupled to the adaptor or on the optical link coupled to the adaptor. Signals from the CAN bus are conditionally transmitted to the optical link depending on the detected direction of transmission. The adaptor can operate at the physical layer without analyzing contents of the CAN bus communications.

21 Claims, 4 Drawing Sheets

(56) References Cited

U.S. PATENT DOCUMENTS

| | | | |
|---|---|---|---|
| 2011/0093639 A1* | 4/2011 | Richards | 710/310 |
| 2011/0188803 A1 | 8/2011 | Kordahi et al. | |
| 2012/0189302 A1 | 7/2012 | Yuki et al. | |
| 2012/0297105 A1* | 11/2012 | Elend | 710/305 |
| 2014/0215109 A1* | 7/2014 | Hopfner | 710/105 |
| 2014/0330996 A1* | 11/2014 | de Haas | 710/106 |
| 2014/0376599 A1* | 12/2014 | XI et al. | 375/211 |
| 2015/0029902 A1* | 1/2015 | Tischler et al. | 370/276 |
| 2015/0063165 A1* | 3/2015 | Chu | 370/254 |

OTHER PUBLICATIONS

Rohr et al. "Switch, minibridge and multiplexer for optical and electrical mixed Controller Area Networks (CAN)." Conference Internet Article. Jun. 15, 2006, pp. 1-7. Retrieved from http://www.can-cai.org/fileadmin/cia/files/icc/11/rohr.pdf on Sep. 26, 2013.

Barlow et al. "Latest Generation Subsea Observatory Standards—A Systems Architecture Review." Oceans 2007, pp. 1-5. Sep. 29, 2007.

Lecroart et al. "Power and optical communications for long tiebacks." Nuclear Instruments and Methods in Physics Research. 602(1):246-251 (Apr. 11, 2009).

Maffei et al. "A Modular Gigabit Ethernet Backbone for Neptune and Other Ocean Observatories." The Third International Workshop on Scientific Use of Submarine Cables and Related Technologies. 7 pages, Jun. 25, 2003.

Phibbs et al. "Cabled Ocean Science Observatories as Test Beds for Underwater Technology." Oceans 2007—Europe Conference Publications, pp. 1-5, Jun. 18, 2007.

* cited by examiner

SYSTEMS AND METHODS FOR SUBSEA OPTICAL CAN BUSES

BACKGROUND

The present invention relates to the field of communication buses and, in particular, to systems and methods for adapting controller area network buses for subsea optical communication.

Subsea systems, such as those used in exploration and production of oil and gas, continue to increase in complexity. A subsea well can include sensors and actuators located at or below the sea floor. The sensors can be, for example, pressure sensors, temperature sensors, and erosion detectors. The actuators can be, for example, valves, pumps, and other flow control devices. Information from the sensors is commonly processed by equipment at a surface facility. Similarly, controls for the actuators commonly originate at a surface facility. Accordingly, communication is needed between the subsea devices and equipment at the surface.

Controller area network (CAN) buses are used to interconnect sensors, actuators, controllers, and other devices in applications such as automobiles, industrial automation, and medical equipment. Many circuits and devices have been developed for CAN bus communications. However, current CAN bus based subsea systems face several limitations. Network size is restricted due to the impedance drop that results from connecting multiple electrical devices in parallel. Additionally, the driver component of the network is susceptible to data corruption or damage from a short circuit failure if long transmission lines cause time delays.

SUMMARY

Systems and methods for communicating controller area network buses via subsea optical links are provided. In one aspect, the invention provides a device for adapting a controller area network (CAN) bus for optical communication. The device includes: a CAN transceiver coupled to a CAN bus, configured to sense levels on the CAN bus and supply a first signal indicating the sensed levels, and configured to receive a second signal and drive a corresponding level on the CAN bus; an opto-electrical converter configured to convert an optical input to an electrical signal to supply the second signal; an electro-optical converter configured to convert a third electrical signal to an optical input to supply an optical output, a direction detection flip-flop configured to receive the second signal from the opto-electrical converter and the first signal from the CAN transceiver and to produce a direction detection signal by latching the status of the second signal at transitions of the first signal corresponding to transitions of the CAN bus from a recessive state to a dominant level; and a transmit enable buffer coupled to the first signal and configured to produce the third electrical signal by conditionally outputting the first signal based on the direction detection signal.

In another aspect, the invention provides a device for adapting a controller area network bus for subsea optical communication. The device includes: direction detection circuitry configured to receive a first signal indicative of a status of the controller area network bus and a second signal indicative of a status of an optical signal received by the device, and to supply a transmission-direction signal indicating a transmission direction using the received signals; and transmit-enable circuitry configured to supply a transmit signal to an electro-optical converter for optical transmission, the transmit signal supplied by combining the first signal and the transmission-direction signal.

In another aspect, the invention provides a subsea device. The subsea device includes: an underwater housing having an optical input and an optical output; a controller area network device coupled to a controller area network bus; a controller area network transceiver coupled to the controller area network bus, configured to sense levels on the controller area network bus and supply a first signal indicating the sensed levels, and configured to receive a second signal and drive a corresponding level on the controller area network bus; an opto-electrical converter coupled to the optical input and configured to convert a signal received on the optical input to an electrical signal to supply the second signal; an electro-optical converter coupled to the optical output and configured to convert a third signal to an optical signal for transmission on the optical output; direction detection circuitry configured to receive the second signal and the first signal and to supply a transmission-direction signal indicating whether a signal is being transmitted from the controller area network bus; and transmit-enable circuitry coupled to the controller area network transceiver, the direction detection circuitry, and the electro-optical converter and configured to supply the third signal equaling the first signal when enabled by the transmission-direction signal indicating transmission from the controller area network bus.

In another aspect, the invention provides a device for adapting a controller area network (CAN) bus for subsea communication. The device includes: a CAN transceiver coupled to a CAN bus, configured to sense levels on the CAN bus and supply a first signal indicating the sensed levels, and configured to receive a second signal and drive a corresponding level on the CAN bus; an acoustic modem configured to convert an acoustic input to an electrical signal to supply the second signal and to convert a third electrical signal to an acoustic signal to supply an acoustic output; a direction detection flip-flop configured to receive the second signal from the acoustic modem and the first signal from the CAN transceiver and to produce a direction detection signal by latching the status of the second signal at transitions of the first signal corresponding to transitions of the CAN bus from a recessive state to a dominant level; and a transmit enable buffer coupled to the first signal and configured to produce the third electrical signal by conditionally outputting the first signal based on the direction detection signal.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
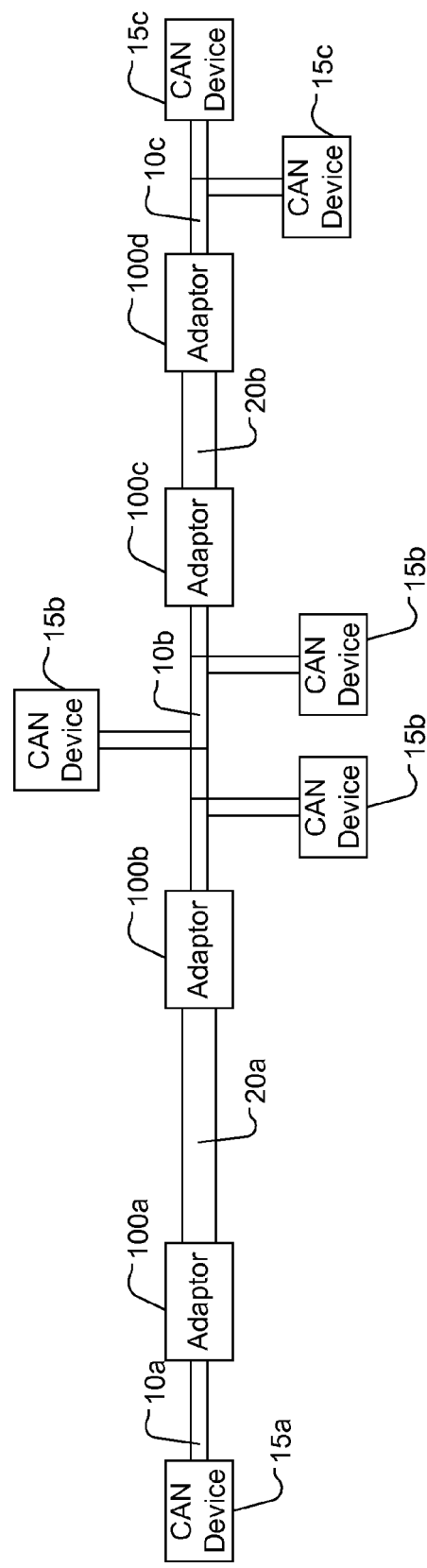
FIG. 1 is a block diagram of a controller area network in accordance with aspects of the invention.

FIG. 1 is a block diagram of a controller area network in accordance with aspects of the invention. The controller area network (CAN) includes three bus groups. A first bus group includes a CAN device 15a connected to a first CAN bus 10a. A second bus group includes CAN devices 15b connected to a second CAN bus 10b. A third bus group includes CAN devices 15c connected to a third CAN bus 10c.

The CAN bus 10 of each bus group serves as a communication medium for the CAN devices 15 of that bus group. For example, one of the CAN devices 15b of the second bus group may communicate over the second CAN bus 10b with another one of the CAN devices 15b of the second bus group. Data are transmitted on the CAN bus 10 as a sequence of binary pulses. The binary pulses are received by all of the CAN devices 15 connected to the CAN bus 10 including the transmitting one of the CAN devices 15. In the CAN bus protocol, messages are transmitted in standard formats. The messages may include an identifier of the associated device, message data, and various control fields. The messages can vary in length and may include more than 100 bits.

Each CAN bus 10 commonly uses a differential pair of signal wires. The signal wires are termed a high signal "CANH" and a low signal "CANL." The CAN protocol designates a logic 0 as a "dominant" signal and a logic 1 as a "recessive" signal. Recessive signals are represented by a lower voltage on the CANH signal and a higher voltage on the CANL signal. Dominant signals are represented by a higher voltage on the CANH signal and a lower voltage on the CANL signal. Other signal representation may be used. The electrical characteristics of transmitters coupled to a CAN bus are such that if a dominant signal is transmitted from any transmitter, a dominant signal appears on the bus. This occurs even if other transmitters are transmitting recessive signals. This may also be viewed as the transmitters only transmitting the dominant signal with the default state of the CAN bus being recessive.

The CAN devices 15 may include sensors and actuators. The CAN devices 15 also include circuitry to interface to the CAN bus 10. The interface circuitry includes electrical and protocol functions. When one of the CAN devices 15 can initiate communication with other CAN devices 15, the initiating device may be considered a master and the other devices considered slaves. In some embodiments, the controller area network has a single master CAN device.

Pairs of the bus groups are connected via inter-bus links 20. Each of the inter-bus links 20 may use a pair of optical links with one optical fiber for communication in one direction and a second optical fiber for communication in the opposite direction. Alternatively, wired or wireless links may be used rather than optical links. For example, acoustic modems may be used for communication on one of the inter-bus links 20. Additionally, a single optical fiber may be used, for example, by using wave division duplexing.

Adaptors 100 couple the CAN buses 10 to the inter-bus links 20. The adaptors 100 transmit sequences of binary pulses received from a CAN bus 10 to an inter-bus link 20 and transmit sequences of binary pulses received from the inter-bus link 20 to the CAN bus 10. A pair of the adaptors 100, one at each end of one of the inter-bus links 20 can thus couple two of the CAN buses 10. Each of the adaptors 100 may be the same or similar.

In the controller area network of FIG. 1, a first adaptor 100a couples the first CAN bus 10a to a first inter-bus link 20a, and a second adaptor 100b couples the second CAN bus 10b to the first inter-bus link 20a. Similarly, a third adaptor 100c couples the second CAN bus 10b to a second inter-bus link 20b, and a fourth adaptor 100d couples the third CAN bus 10c to the second inter-bus link 20b. Each of the adaptors 100 provides bidirectional communication so that information can be communicated between the bus groups in either direction. Additionally, the CAN devices may communicate through multiple inter-bus links 20. For example, the CAN device 15a in the first bus group may transmit data to one of the CAN devices 15c in the third bus group via the first CAN bus 10a, the first adaptor 100a, the first inter-bus link 20a, the second adaptor 100b, the second CAN bus 10b, the third adaptor 100c, the second inter-bus link 20b, the fourth adaptor 100d, and the third CAN bus 10c. The adaptors 100 function in the same manner whether a CAN device 15 on the CAN bus 10 that one of the adaptors 100 is connected to is considered a master or a slave device.

The inter-bus links 20 and associated adaptors 100 may allow the CAN buses 10 and the associated CAN devices 15 to be separated by large distances, for example, several kilometers. The adaptors 100 can be used to provide electrical isolation between the CAN buses 10. The adaptors 100 can also be used to couple CAN buses with incompatible electrical characteristics. The use of bus groups interconnected through adaptors may also allow a larger number of CAN devices to communicate, for example, by avoiding low impedances caused by a large number parallel connected devices.

In an embodiment, one or more of the bus groups is located subsea and the inter-bus links 20 are provided by optical fibers. Accordingly, the controller area network of FIG. 1 can be considered to provide a subsea optical CAN bus.

The adaptors 100 break circular traffic that could block communication in the network. The adaptors 100 only transmit dominant signals to the inter-bus link when the dominant signals are first received from the local CAN bus. Dominant signals that are first received from the inter-bus link and then appear on the local CAN bus are not retransmitted to the inter-bus link.

The adaptors 100 transmit pulses between a CAN bus 10 and an inter-bus link 20 pulse by pulse. That is, each pulse is transmitted when it is received without analyzing subsequent pulses to determine whether to transmit the pulse.

Prior devices for coupling buses have stored all or part of an entire message before transmitting the first pulses of the message. For example, the identifier of the messages may have been looked up in a table of device identifiers to determine the location of the corresponding device and based on the location determine whether to transmit the message. Storing the messages leads to undesired delays during signal transmission. The circuitry for analyzing and storing the messages increases complexity and cost. Additionally, a table of device identifiers and corresponding locations may be difficult to configure and maintain. In other words, prior devices include functions that operate at higher protocol levels, such as a data link layer.

In an embodiment, a single master processor can communicate with every CAN device in the network. Additionally, protecting a system with at least one back up processor results in a very reliable and cost effective system in the event of a primary processor failure.

Although the controller area network is illustrated in FIG. 1 with a particular number of bus groups and a particular combination of CAN devices, other embodiments may have a different number of bus groups and a different combination of CAN devices. Additionally, to enable a concise description, this disclosure uses the terminology of the CAN bus protocol, for example, as described in the ISO 11898 series of standards. The devices, methods, and techniques described are also applicable to other protocols.

Figure 2:
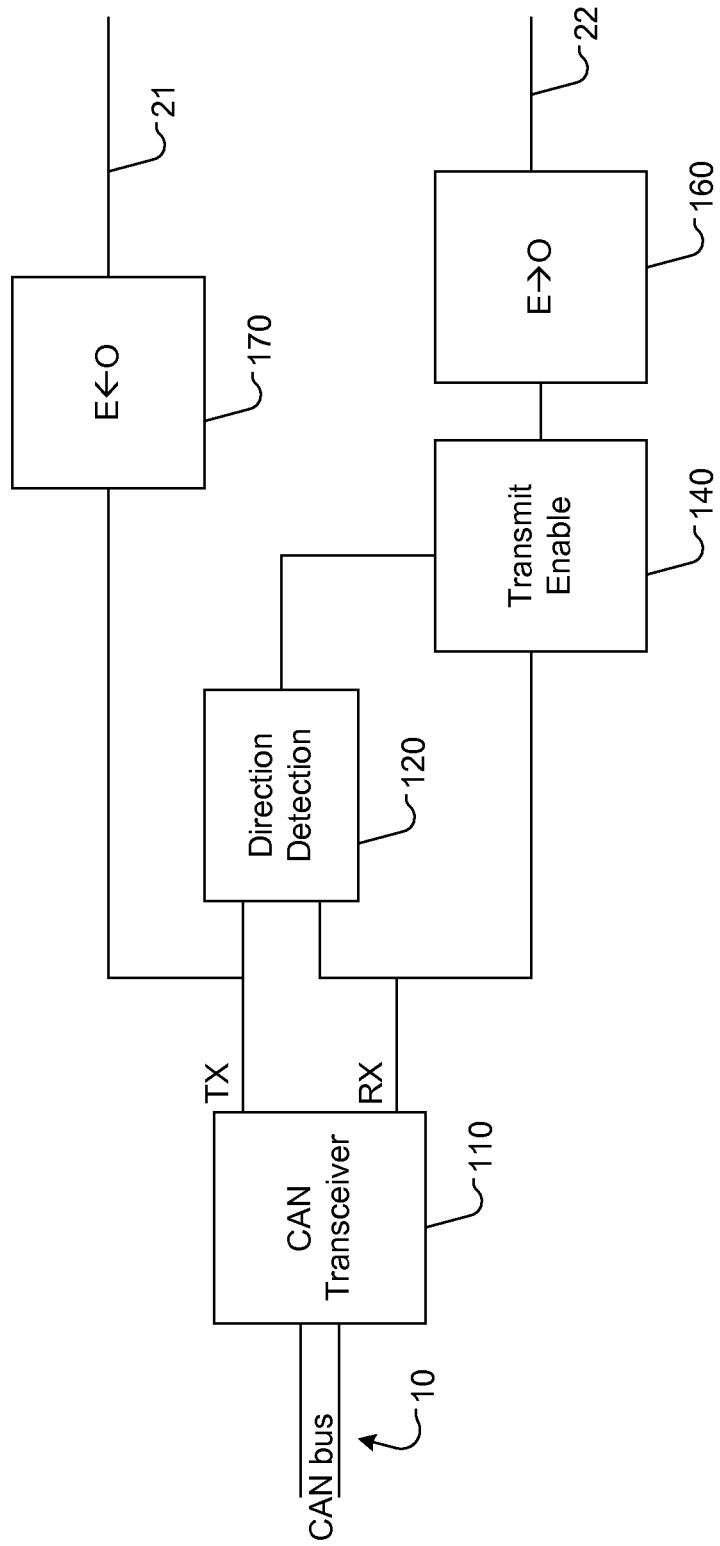
FIG. 2 is a functional block diagram of an adaptor for communicating a controller area network bus optically in accordance with aspects of the invention.

FIG. 2 is a functional block diagram of an adaptor for communicating a controller area network bus optically in accordance with aspects of the invention. The adaptor transmits signals received from an optical receive link 21 to a CAN bus 10. The adaptor also transmits signals from the CAN bus 10 to an optical transmit link 22.

The adaptor of FIG. 2 may be used as one of the adaptors 100 of the controller area network described with reference to FIG. 1. For example, when the adaptor is used as the first adaptor 100a of the controller area network of FIG. 1, the CAN bus 10 corresponds to the first CAN bus 10a and the optical receive link 21 and the optical transmit link 22 make up the first inter-bus link 20a.

The adaptor includes a CAN transceiver 110. The CAN transceiver 110 is coupled to the CAN bus 10. The coupling may be via a coupling network, for example, a network of resistors and capacitors for impedance matching. The CAN transceiver 110 may be an integrated circuit, for example, a TJA1054A from NXP Semiconductors. A receive signal RX is supplied by the CAN transceiver 110 that signals the level the CAN transceiver 110 senses on the CAN bus 10. The receive signal is a logic 0 when a dominant level is sensed and a logic 1 when a recessive level is sensed. The CAN transceiver 110 receives a transmit signal TX and drives a corresponding level on the CAN bus 10.

The CAN transceiver 110 may include additional functions, such as fault detection and various power states. For example, the CAN bus transceiver 100 may detect a persistent dominant state and then disable driving the CAN bus. This may be useful for initialization, or for recovering from an erroneous state caused, for example, by a noise transient. In some embodiments, a persistent dominant state is detected by other blocks of the adaptor.

The adaptor also includes an electro-optical converter 160 and an opto-electrical converter 170. The electro-optical converter 160 converts an electrical signal from a transmit enable module 140 to an optical signal for transmission on the optical transmit link 22. The electro-optical converter 160 may include devices such as a light-emitting diode or a laser diode. The opto-electrical converter 170 converts an optical signal received from the optical receive link 21 to an electrical signal for use in the adaptor including as the transmit signal TX supplied to the CAN bus transceiver 110. The opto-electrical converter 170 may include devices such as a phototransistor or a PIN diode. In an embodiment, a light-on signal is used for the dominant level and a light-off signal is used for the recessive level. In alternative embodiments, the electro-optical converter 160 and the opto-electrical converter 170 may be replaced with converters appropriate to the type of communication used on the corresponding inter-bus link. In an embodiment, the electro-optical converter 160 and the opto-electrical converter 170 are replaced with an acoustic modem that can convert an electrical signal to an acoustic signal for transmission and convert a received acoustic signal to an electrical signal.

The transmit enable module 140 supplies a signal to the electro-optical converter 160 for transmission from the adaptor. The signal supplied is based on the receive signal RX from the CAN transceiver 110 and a direction detection signal from a direction detection module 120.

The direction detection module 120 determines whether a signal is being transmitted from the CAN bus 10 to the optical transmit link 22 or from the optical receive link 21 to the CAN bus 10. The direction detection module 120 determines the direction using the signal from the opto-electrical converter 170 and the receive signal RX from the CAN transceiver 110. The direction detection module 120 can determine whether a recessive-to-dominant transition on the receive signal RX from the CAN transceiver 110 occurs before a recessive-to-dominant transition on the signal from the opto-electrical converter 170. When the transition occurs first on the receive signal RX from the CAN transceiver 110, the dominant signal originated on the CAN bus 10.

When the dominant signal originated on the CAN bus 10, the transmit enable module 140 passes the receive signal RX from the CAN transceiver 110 to the electro-optical converter 160. When the dominant signal did not originate on the CAN bus 10, the transmit enable module 140 supplies a recessive signal to the electro-optical converter 160. Since a recessive signal is the default state of a CAN bus, the adaptor may be considered to be transmitting when the transmit enable module 140 produces a dominant signal and not transmitting when the transmit enable module 140 produces a recessive signal. Not transmitting may also be viewed as transmitting a recessive signal.

By only transmitting dominant signals to the optical transmit link 22 when the dominant signal originated on the CAN bus 10, the adaptor prevents a closed-loop lock that could otherwise occur. If an adaptor simply converted the receive signal RX from the CAN transceiver 110 to an optical signal and transmitted it on the optical transmit link 22, a dominant signal (originating from the CAN bus or the optical receive link) would persist indefinitely. For example, a dominant signal received from the optical receive link 21 by the opto-electrical converter 170 is supplied to the CAN transceiver 110 and driven on the CAN bus 10. Since the CAN transceiver 110 reflects the state of the CAN bus 10, it supplies a dominant signal on the receive signal RX. Without a transmit enable module, the dominant signal is transmitted by the electro-optical converter 160 on the optical transmit link 22. A like adaptor at the remote end of the optical links would function in the same way and retransmit a dominant signal on its optical transmit link which is received by the opto-electrical converter 170. Thus, closed-loop lock results unless the adaptors are configured to prevent this problem.

Figure 3:
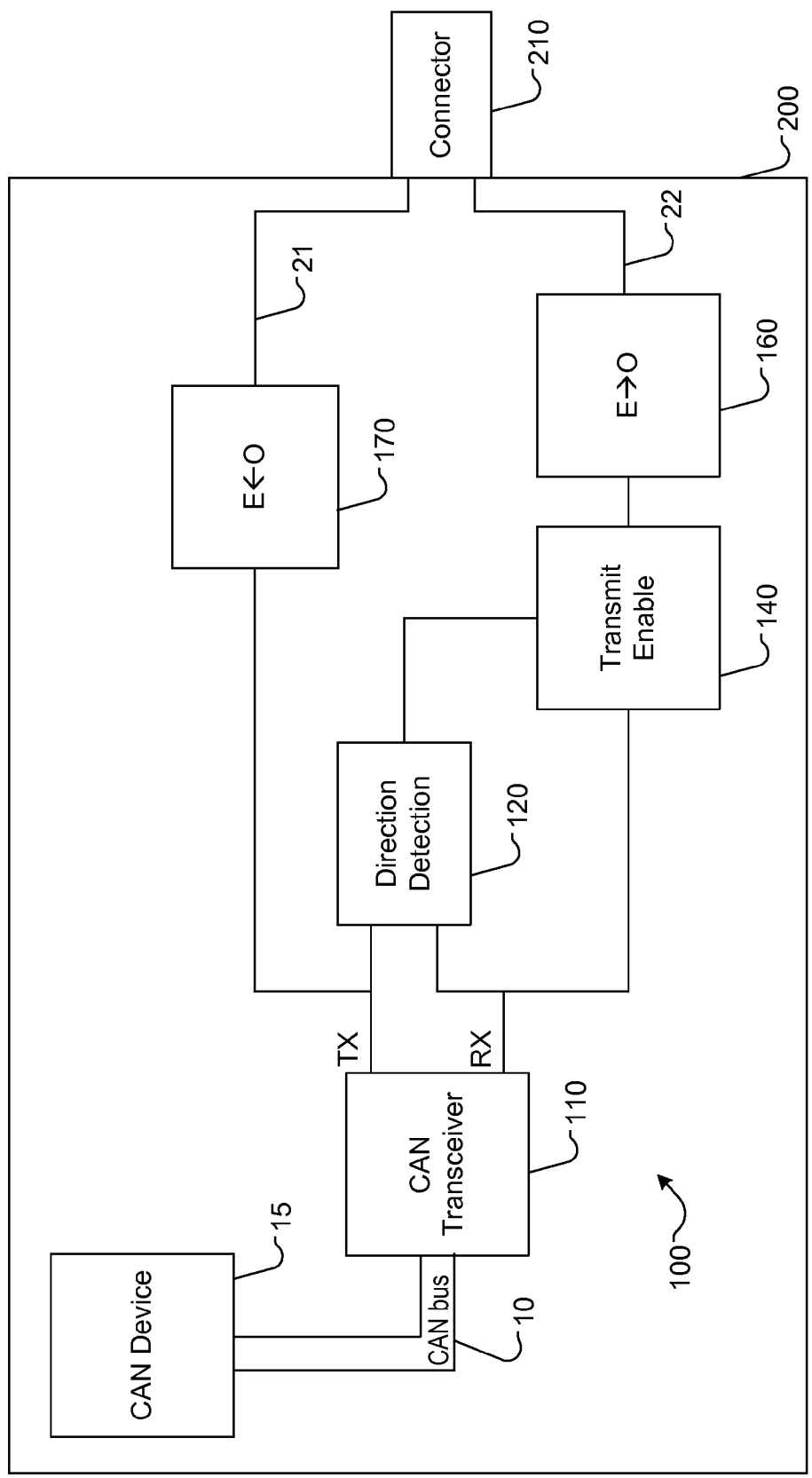
FIG. 3 is a functional block diagram of a subsea device with an adaptor similar to the adaptor of FIG. 2 installed in a subsea equipment enclosure in accordance with aspects of the invention.

FIG. 3 is a functional block diagram of a subsea device with an adaptor similar to the adaptor of FIG. 2 installed in a subsea equipment enclosure in accordance with aspects of the invention. The subsea device includes a CAN device 15 which may include an input device such as a pressure or temperature sensor as well as a CAN bus controller which controls sending and receiving of signals between the input device and a CAN bus 10. The CAN device 15 is housed in an enclosure 200. The enclosure 200 may be a sealed subsea equipment housing. The enclosure 200 also houses an adaptor 100.

The adaptor 100 includes a CAN transceiver 110, a direction detection module 120, a transmit enable module 140, an electro-optical converter 160, and an opto-electrical converter 170. The components of the adaptor 100 function in a like manner to like named components of the adaptor of FIG. 2. The electro-optical converter 160 transmits a signal on an optical transmit link 22. The opto-electrical converter 170 receives a signal from an optical receive link 21. The subsea device may include a connector 210 for connecting a fiber optic cable associated with optical transmit and receive links 20, 21 to subsea optical links or cables. The connector 210 may be provided by a suitable underwater connector or penetrator. The connector 210 may, for example, be used to connect the subsea device to a subsea optical or electro-optical cable.

In the embodiment illustrated in FIG. 3, the CAN bus 10 is not connected external to the subsea device. That is, the CAN bus 10 only connects to the CAN device 15 and the CAN transceiver 110. Some circuitry may be shared between the CAN device 15 and the CAN transceiver 110 and circuitry used to transmit and receive to and from the CAN bus may be simplified or eliminated. In other embodiments, additional CAN devices may be coupled to the CAN bus 10.

Figure 4:
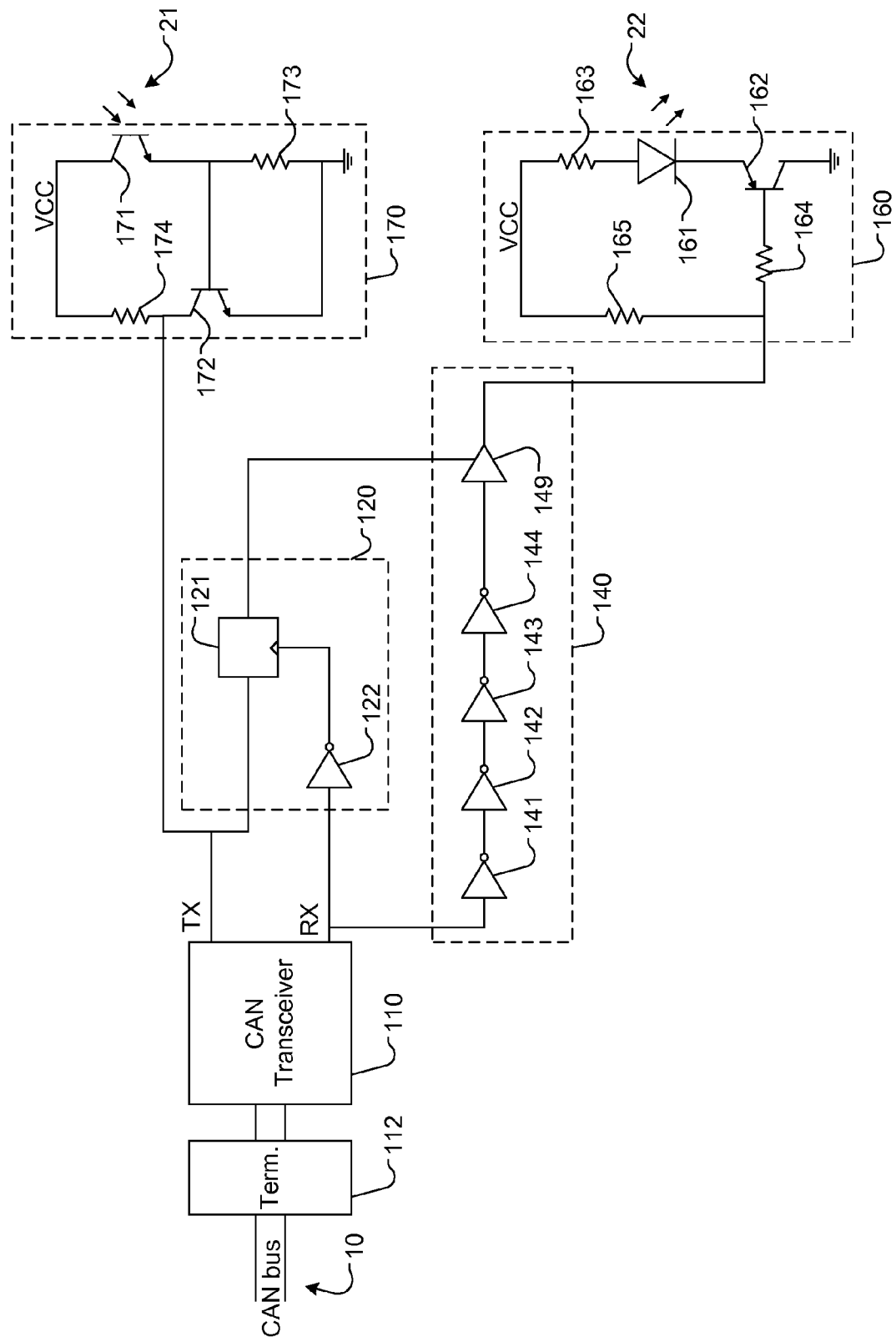
FIG. 4 is a schematic diagram of an adaptor for communicating a controller area network bus optically in accordance with aspects of the invention.

FIG. 4 is a schematic diagram of an adaptor for communicating a controller area network bus optically in accordance with aspects of the invention. The adaptor operates in substantially the same manner as the adaptor of FIG. 2. The adaptor of FIG. 4 transmits signals received from an optical input 21 to a CAN bus 10. The adaptor transmits signals from the CAN bus 10 to an optical output 22. The adaptor may be used as one of the adaptors 100 of the controller area network described with reference to FIG. 1.

The adaptor includes a CAN transceiver 110. The CAN transceiver 110 is coupled to the CAN bus 10 via a coupling network 112. The coupling network 112 may be a network of resistors and capacitors arranged for impedance matching. The CAN transceiver 110 may be the same or similar to the CAN transceiver of the adaptor of FIG. 1. The CAN transceiver 110 supplies a receive signal RX that signals the level on the CAN bus 10. The CAN transceiver 110 receives a transmit signal TX and drives a corresponding level on the CAN bus 10. In the illustrated embodiment, on the receive and transmit signals, a low level corresponds to a logic 0 or dominant level and a high level corresponds to a logic 1 or recessive level.

The adaptor includes an electro-optical converter 160 that includes a light-emitting diode 161 to produce the optical output 22. The light-emitting diode 161 is coupled between a positive supply signal VCC and a ground signal in series with a PNP transistor 162 and a first transmit resistor 163. The PNP transistor 162 operates to switch the light-emitting diode 161 off and on and thereby control signaling on the optical output 22. The first transmit resistor 163 limits current through the light-emitting diode 161. The PNP transistor 162 has its base terminal coupled to the positive supply signal VCC by a second transmit resistor 164 and a third transmit resistor 165 coupled in series. The midpoint between the second transmit resistor 164 and the third transmit resistor 165 is coupled to a transmit enable buffer 149 to receive a signal to be transmitted. The second transmit resistor 164 and the third transmit resistor 165 provide biasing and provide a pullup when the transmit enable buffer 149 is disabled.

The adaptor includes an opto-electrical converter 170 that include a phototransistor 171 to receive the optical input 21. The phototransistor 171 has its collector terminal connected to the positive supply signal VCC and its emitter terminal coupled to the ground signal via a first receive resistor 173. The emitter terminal of the phototransistor 171 is also coupled the base terminal of an NPN transistor 172. The NPN transistor 172 has its emitter terminal connected to the ground signal and its collector terminal coupled to the positive supply signal VCC via a second receive resistor 174. The NPN transistor 172, the first receive resistor 173, and the second receive resistor 174 combine to amplify the signal from the phototransistor 171. The amplified signal is used in the adaptor including as the transmit signal TX supplied to the CAN bus transceiver 110. In the illustrated embodiment, a light-on signal is used for the dominant level and a light-off signal is used for the recessive level on the optical input 21 and the optical output 22.

A transmit enable module 140 includes a series of inverters and the transmit enable buffer 149. The transmit enable buffer 149 has an output signal that supplies the signal to be transmitted as the optical output 22. The transmit enable buffer 149 is a tristate buffer that is enabled by a direction detection signal from a direction detection flip-flop 121. The transmit enable buffer 149 receives a data input from a fourth transmit enable inverter 144 that is connected in series with a third transmit enable inverter 143 that is connected in series with a second transmit enable inverter 142 that is connected in series with a first transmit enable inverter 141. The first transmit enable inverter 141 receives as its input the receive signal RX from the CAN transceiver 110.

When disabled, the output of the transmit enable buffer 149 is pulled high by the third transmit resistor 165. When enabled, the output of the transmit enable buffer 149 matches the receive signal RX from the CAN transceiver 110 (albeit delayed). The delay provided by the transmit enable invertors is used to match circuit delays incurred to produce the direction detection signal. Thus, the delay provided by the transmit enable inverters does need to be adjusted for different data rates. Since the delay is used to match the delay of other digital circuits, the delay can be provided without the use of an analog circuit, which could be difficult to implement.

A direction detection module 120 in the embodiment of FIG. 4 includes the direction detection flip-flop 121 that is used in determining whether a signal is being transmitted from the CAN bus 10 to the optical output 22 or from the optical input 21 to the CAN bus 10. The direction detection flip-flop 121 receives as a data input the amplified signal reflecting the optical input 21, which is the transmit signal TX supplied to the CAN transceiver 110. The direction detection flip-flop 121 latches its data input triggered by rising edges of a clock input to the direction detection flip-flop 121. The clock input is an inverted version of the receive signal RX from the CAN transceiver 110 supplied from a direction detection inverter 122. The direction detection flip-flop 121 supplies its data output to the transmit enable buffer 149 as the direction detection signal.

The direction detection signal is high and the transmit enable buffer 149 is enabled when the direction detection flip-flop 121 stores a high signal. The direction detection signal is low and the transmit enable buffer 149 is disabled when the direction detection flip-flop 121 stores a low signal. Since the direction detection flip-flop 121 stores the state of the transmit signal TX at falling edges of the receive signal RX, the transmit enable buffer 149 is enabled when the transmit signal TX is high (recessive) when the receive signal RX falls (recessive to dominant transition). Conversely, the transmit enable buffer 149 is disabled when the transmit signal TX is low (dominant) when the receive signal RX falls (recessive to dominant transition).

Thus, the direction detection flip-flop 121 and associated circuitry serve to determine whether a recessive-to-dominant transition on the receive signal RX occurs before a recessive-to-dominant transition on the transmit signal TX. When the transition occurs first on the receive signal RX, the dominant signal originated on the CAN bus 10. Since the adaptor only transmits dominant signals to the optical output 22 when the dominant signal originated on the CAN bus 10, the adaptor prevents a closed-loop lock that could otherwise occur.

In an example embodiment, the direction detection flip-flop 121 is provided by a 74HC74 integrated circuit. The direction detection inverter 122, the first transmit enable inverter 141, the second transmit enable inverter 142, the third transmit enable inverter 143, and the fourth transmit enable inverter 144 are provided by a 74HC540 integrated circuit. The transmit enable buffer 149 is provided by a 74HC126 integrated circuit. The light-emitting diode 161 is an IF-E91A from Industrial Fiber Optics. The PNP transistor 162 is a 2N2907. The first transmit resistor 163 is 220Ω, the second transmit resistor 164 is 3.9 kΩ and the third transmit resistor 165 is 4.7 kΩ. The phototransistor 171 is an IF-D92 from Industrial Fiber Optics. The NPN transistor 172 is a 2N2222A. The first receive resistor 173 is 220Ω and the second receive resistor 174 is 2.2 kΩ. It should be recognized that many variations are also possible.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative blocks and modules described in connection with the embodiments disclosed herein can be implemented in or with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A device for adapting a controller area network (CAN) bus for optical communication, the device comprising:
   a CAN transceiver coupled to a CAN bus, configured to sense levels on the CAN bus and supply a first signal indicating the sensed levels, and configured to receive a second signal and drive a corresponding level on the CAN bus;
   an opto-electrical converter configured to convert an optical input to an electrical signal to supply the second signal;
   an electro-optical converter configured to convert a third electrical signal to an optical signal to supply an optical output;
   a direction detection flip-flop configured to receive the second signal from the opto-electrical converter and the first signal from the CAN transceiver and to produce a direction detection signal by latching the status of the second signal at transitions of the first signal corresponding to transitions of the CAN bus from a recessive state to a dominant level;
   and
   a transmit enable buffer coupled to the first signal and configured to produce the third electrical signal by conditionally outputting the first signal based on the direction detection signal.

2. The device of claim 1, wherein the direction detection signal indicates transmission from the CAN bus when the latched status of the second signal corresponds to a recessive signal and the direction detection signal indicates transmission to the CAN bus when the latched status of the second signal corresponds to a dominant signal.

3. The device of claim 2, wherein the transmit enable buffer outputs the first signal to the electro-optical converter and the electro-optical converter converts the first signal to an optical signal supplied to the optical output when the direction detection signal indicates transmission from the CAN bus and the latched status of the second signal corresponds to a recessive level.

4. The device of claim 2, wherein the optical output corresponds to a recessive level when the direction detection signal indicates transmission to the CAN bus.

5. A device for adapting a controller area network bus for subsea optical communication, the device comprising:
   a connector for connection to a subsea optical or electro-optical cable, the connector having an optical input and an optical output;
   a controller area network bus transceiver coupled to a controller area network bus and configured to supply a first signal indicative of the status of the controller area network bus and to drive the controller area network bus based on a second signal indicative of a status of an optical signal received at the connector from the subsea optical or electro-optical cable;
   direction detection circuitry configured to receive the first signal indicative of the status of the controller area network bus and the second signal indicative of the status of an optical signal received by the device at the connector, and to supply a transmission-direction signal indicating a transmission direction using the received signals; and
   transmit-enable circuitry configured to supply a transmit signal to an electro-optical converter for optical transmission to a subsea optical or electro-optical cable connected to the connector, the transmit signal supplied by combining the first signal and the transmission-direction signal.

6. The device of claim 5, wherein the direction detection circuitry comprises a storage element.

7. The device of claim 6, wherein the storage element is arranged to store the value of the second signal at an edge of the first signal.

8. The device of claim 7, wherein the edge of the first signal corresponds to a transition of the controller area network bus from a recessive level to a dominant level.

9. The device of claim 8, wherein the transmission-direction signal indicates transmission from the controller area network bus for optical transmission to the subsea optical or electro-optical cable connected to the optical output when the stored value of the second signal corresponds to a recessive level.

10. The device of claim 9, wherein the transmit signal supplied by the transmit-enable circuitry equals the first signal when the transmission-direction signal indicates transmission from the controller area network bus.

11. The device of claim 9, wherein the transmit signal supplied by the transmit-enable circuitry corresponds to a recessive level when the transmission-direction signal does not indicate transmission from the controller area network bus.

12. The device of claim 5, further comprising an opto-electrical converter coupled to the direction detection circuitry to supply the second signal based on the optical signal received at the optical input from the subsea optical or electro-optical cable.

13. A device for adapting a controller area network bus for subsea optical communication, the device comprising:
  direction detection circuitry configured to receive a first signal indicative of a status of the controller area network (CAN) bus and a second signal indicative of a status of an optical signal received by the device, and to supply a transmission-direction signal indicating a transmission direction using the received signals;
  an opto-electrical converter coupled to the direction detection circuitry to supply the second signal based on the optical signal received by the device;
  transmit-enable circuitry configured to supply a transmit signal combining the first signal and the transmission-direction signal; and
  an electro-optical converter coupled to the transmit-enable circuitry to optically transmit the transmit signal from the device;
  whereby the transmission-direction signal indicates transmission of the first signal from the CAN bus to the electro-optical converter via the transmit enable circuitry when the second signal corresponds to a recessive signal and the transmission-direction signal indicates transmission of the second signal from the opto-electrical converter to the CAN bus when the second signal corresponds to a dominant signal.

14. The device of claim 5, wherein the direction detection circuitry is a digital circuit.

15. A subsea device, comprising:
  an underwater enclosure having an optical input and an optical output;
  the enclosure containing at least one controller area network device coupled to a controller area network bus and an adaptor device configured to transmit signals received from the optical input to the controller area network bus and to transmit signals received from the controller area network bus to the optical output;
  the adaptor device comprising:
    a controller area network transceiver coupled to the controller area network bus, configured to sense levels on the controller area network bus and supply a first signal indicating the sensed levels, and configured to receive a second signal and drive a corresponding level on the controller area network bus;
    an opto-electrical converter coupled to the optical input and configured to convert a signal received on the optical input to an electrical signal to supply the second signal;
    an electro-optical converter coupled to the optical output and configured to convert a third signal to an optical signal for transmission on the optical output;
    direction detection circuitry configured to receive the second signal and the first signal and to supply a transmission-direction signal indicating whether a signal is being transmitted from the controller area network bus; and
    transmit-enable circuitry coupled to the controller area network transceiver, the direction detection circuitry, and the electro-optical converter and configured to supply the third signal equaling the first signal when enabled by the transmission-direction signal indicating transmission from the controller area network bus.

16. The subsea device of claim 15, wherein the direction detection circuitry is a digital circuit.

17. The subsea device of claim 15, wherein the direction detection circuitry comprises a storage element arranged to store values of the second signal at edges of the first signal.

18. The subsea device of claim 17, wherein the edges of the first signal correspond to transitions of the controller area network bus from a recessive level to a dominant level.

19. The subsea device of claim 18, wherein the transmission-direction signal indicates transmission from the controller area network bus when the stored value of the second signal corresponds to a recessive level.

20. The subsea device of claim 19, wherein the third signal supplied by the transmit-enable circuitry corresponds to a recessive level when the transmit-enable circuitry is not enabled by the transmission-direction signal indicating transmission from the controller area network bus.

21. The subsea device of claim 15, further comprising a subsea connector arranged for coupling the optical input and the optical output to a subsea optical or electro-optical cable.

* * * * *